Patented Jan. 14, 1936

2,027,435

UNITED STATES PATENT OFFICE 2,027,435

ART OF STICKING BODIES

Ernest L. Kallander and Gardner R. Alden, Framingham, Mass., assignors to Dennison Manufacturing Company, Framingham, Mass., a corporation of Massachusetts No Drawing. Application November 15, 1932, Serial No. 642,762

12 Claims. (Cl. 91—68)

This invention relates to the art of sticking bodies by the use of adhesive compositions which, although generally useful, are designed more especially for use in connection with foundations of a smooth, more or less water-impermeable nature, such as "cellophane", nitrocellulose and cellulose acetate films, metal foils, or the like. It also relates to articles such as labels, seals, stickers, and tapes carrying a coating of the composition in a dried or set state and which are designed to be subsequently moistened and stuck to foundations of the foregoing character. It relates still further to the art of restoring the adhesive coating quickly to a sticky or tacky condition and to the moistening liquids applicable for such purpose.

While not restricted thereto, we shall hereinafter deal with the value of our invention in connection with "waterproof cellophane", for the usual water-soluble adhesive, such as glue, cannot be made to stick properly to "waterproof cellophane". This is especially true when the "cellophane" has been made waterproof or water-resistant with nitrocellulose and/or wax or resin compositions and thus resists wetting or absorption of water-soluble adhesives and prevents them from gripping the surface with the proper and permanent tenacity.

We have discovered that a composition comprising generally a solution of so-called "vinylite gums" or "vinyl resins" is highly effective as an adhesive even in connection with "cellophane" of the waterproof variety. These gums, which are procurable on the open market, are condensation products consisting essentially of the condensed esters of vinyl alcohol, e. g., vinyl chloride, vinyl acetate, or mixtures of such esters. They are characterized by their water-insolubility, odorlessness, transparency, stability, and flexibility when in thin films. They are soluble in various organic solvents, being highly soluble in various ester solvents, such as ethyl acetate and butyl acetate, and in various ethers and ketones. They are also soluble in carbon tetrachloride and in the various aromatic hydrocarbons, such as benzol, but they are soluble only to a limited extent in the aliphatic hydrocarbons, such as naphtha or gasoline, which have the effect of swelling them or causing only incipient solution. We have found that such compounds as tetrahydronaphthalene (tetralin), decahydronaphthalene (decalin), a mixture of cyclohexanol and cyclohexanone (hexalin), and various polymerized chlorinated diphenyls also have the effect of plasticizing and rendering more adhesive the vinyl resins. At this point, it might be mentioned that the foregoing compounds, especially aliphatic hydrocarbons, such as those derived from petroleum, can advantageously be used along with true solvents, not only in the vinyl resin adhesive compositions of the present invention, but also in the moistening liquids of the present invention designed to restore the adhesiveness of, or to activate, the dried coatings carried by such articles as labels, seals, stickers, tapes, and the like. Various grades of vinyl resins are available for producing the adhesive composition of the present invention, some being comparatively soft and plastic, and others being hard, yet tough and elastic. Here are some typical commercial vinyl resins such as are used in accordance with our invention:

(1) "Vinnapas B"
(2) "Mowilith N"
(3) "Vinylite A"

The first two vinyl resins are comparatively soft and plastic; the third is harder. All of the foregoing vinyl resins, which consist of polymerized vinyl acetate, yield solutions which, as the solvent is evaporated therefrom, become highly viscous or "stringy." By choosing the appropriate solvent vehicle, namely, one which evaporates quickly, and by providing a sufficient amount of gum in the solution, it is possible to realize almost immediate stickiness or tackiness in a thin coating or film of the solution exposed to the air. Thus, one may use benzol, carbon tetrachloride, ethyl acetate, or similar volatile solvent in preparing the vinyl resin solution. Such a solution is of value in sticking together the edges of waterproof "cellophane" wrappers such as are employed for cigarette packages, cigars, or the like. When the solution is applied as a coating to paper or cloth which is to serve for making labels, seals, stickers, tape, or like articles and is permitted to set or dry thereon, we have observed that there is sufficient plasticity in the coating to give rise to a tendency for "blocking" or adhesion of the successive layers constituting a package. It might here be mentioned that the vinyl resins tend to cohere and that adjacent films of such resins tend naturally to adhere to one another even in a dry state. We have discovered, however, that it is possible to destroy such tendency to adhere by compounding with the vinyl resin solution an appropriate amount of cellulose ester, such as nitrocellulose or cellulose acetate, which functions to increase the hardness or rigidity of the dried coating. When nitrocellulose, cellulose acetate, or similar cellulose esters are added to the solution, the solvent vehicle should be one which acts as a solvent for both the vinyl resin and the cellulose ester. Assuming, for example, that nitrocellulose is the cellulose ester, we may use ethyl acetate, acetone, a mixture of ethyl alcohol and ether, or equivalent solvents or solvent mixtures.

Labels, seals, stickers, adhesive tape, or similar articles coated in accordance with our invention must be moistened with a suitable liquid which quickly imparts stickiness or tackiness to the dried coating. Assuming that the dried coating consists essentially only of vinyl resin, we have discovered that the moistening liquid must contain not only a true solvent of the vinyl resin, but preferably also a swelling agent therefor, since otherwise it is impossible to impart adequate tackiness to the coating quickly or to realize a permanently tenacious bond with "cellophane." As already indicated, there are various liquids, such as naphtha or gasoline, which swell the vinyl resin. These swelling liquids may be mixed with benzol, carbon tetrachloride, or other true solvents of the vinyl resin, to produce the desired moistening liquid. When the coating contains both a vinyl resin and a cellulose ester, such as nitrocellulose or cellulose acetate, the moistening liquid for the coating preferably includes a true solvent of the vinyl resin, a swelling agent therefor, and a suitable solvent of the cellulose ester. In compounding nitrocellulose, for instance, with the vinyl resin, we prefer to use only up to about 30 parts of nitrocellulose to 70 parts of vinyl resin. The solvent of the vinyl resin and the cellulose ester may be one and the same, or be a mixture of a solvent specific for the vinyl resin and a solvent specific for the cellulose ester. When the moistening liquid contains a suitable swelling agent for the vinyl resin, it is unnecessary to use plasticizing agents for either the vinyl resin or the cellulose ester, as the swelling agent is all that is necessary to develop quickly the desired tackiness in the coating, as well as to bring about the desired tenacity of bond between the coating and "cellophane." On the other hand, non-volatile plasticizers for either or both the vinyl resin and the cellulose ester may be used in lieu of, or together with, the swelling agent for the vinyl resin. Thus, we may add to the moistening liquid non-volatile plasticizing agents, such as dibutyl phthalate and tricresyl phosphate, which function to plasticize both the vinyl resin and the cellulose ester in the coating. Inasmuch as these plasticizers have the effect of decreasing the tackiness attainable in the coating, they are preferably not employed excepting in those instances when it is undesirable to employ gasoline or like swelling agents, on account of their objectionable odor; or they are employed in amounts so small that their effect on the tackiness attainable in the coating will be negligible.

We wish again to stress the fact that the moistening liquid should preferably contain not only a true solvent of the vinyl resin, but also a volatile aliphatic hydrocarbon or volatile hydrocarbons of the nature of tetrahydronaphthalene and decahydronaphthalene. It might be well for us here to give a picture of the mechanism probably entering into the action of such a moistening liquid. Thus in moistening a dry film with, let us say, a moistening liquid consisting of one part of alcohol and two parts of naphtha, the alcohol is probably very quickly absorbed by the film, making the resin plastic. The alcohol evidently carries with it a certain amount of naphtha which is also absorbed by the resin. However, since the naphtha is not a true solvent of the resin and since the alcohol and naphtha are miscible in all proportions, the naphtha evidently restrains the solvent action of the alcohol and accordingly represses the solution of the resin. We give this picture for the reason that we know that when resins become liquid or unduly swollen, their tackiness is diminished on account of their reduced viscosity. Apparently, what we do is to effect a controlled solvation, that is, to create a condition such that we form a firm and coherent gel, yet one which has the desired adhesiveness and plasticity.

We shall now deal with the specific examples of applying our invention in practice. Assuming that paper is to be gummed in accordance with our invention, for use in making labels, seals, stickers, tape, or the like, the paper is preferably precoated to provide a ground which prevents the adhesive composition from penetrating into, or being unduly absorbed by, the paper. To this end, the paper may be precoated with fillers, such as precipitated calcium sulphate and/or precipitated calcium carbonates, which are preferably applied together with a suitable size or binder, such as water-soluble casein, as an aqueous paste. To the dried coating on the paper, we apply the adhesive composition of the present invention. A preferred composition is one made up by dissolving 40 parts by weight of vinyl resin gum in 60 parts by weight of suitable solvent, e. g., 30 parts of ethyl acetate and 30 parts of benzol. It is, as already indicated, preferable that such compositions contain an appropriate amount of cellulose ester, wherefore, we preferably add to the foregoing composition about 4 to 12 parts by weight of cellulose nitrate, or equivalent cellulose ester. The resulting composition is quite thin and fluent, and so lends itself to easy and smooth application by the usual coating or spreading machines, as a thin film on the paper. The paper is then dried and put through the desired final manufacturing steps. Thus, when labels are to be made therefrom, the dried paper is passed through the usual printing machines, cut into labels, and packaged; or, when adhesive tape is in view, the dried paper is cut into ribbons or bands of the desired width and accumulated as rolls.

There are various moistening liquids, which in accordance with one phase of our invention, may be used to develop tackiness in the set coating to enable it to be stuck to a surface. The selection of the solvents will depend primarily upon conditions, that is, upon whether solvents having strong odors are permissible, upon the speed of drying and the degree of tackiness or speed or adhesion required, and upon the nature of the surface to be stuck to. We might illustrate by citing the following moistening liquids:—

For straight vinyl resin coatings
1. 50 lbs. toluol
   30 lbs. high grade naphtha
2. 50 lbs. benzol
   30 lbs. high grade naphtha
3. Tetrahydronaphthalene (tetralin)
4. Decahydronaphthalene (decalin)
5. A mixture of cyclohexanol and cyclohexanone (hexalin)
6. 50 lbs. carbon tetrachloride
   10 lbs. high grade naphtha 7. 8 lbs. liquid polymerized chlorinated diphenyl
   2 lbs. dibutyl phthalate
   50 lbs. high grade naphtha
   40 lbs. benzol For mixtures of vinyl resin and nitrocellulose 8. 80 lbs. denatured alcohol
   20 lbs. tetralin
9. 40 lbs. methanol
   25 lbs. high grade naphtha
10. 80 lbs. high grade naphtha
    40 lbs. ethyl alcohol—denatured
11. 10 lbs. liquid chlorinated diphenyl
    40 lbs. ethyl acetate
12. 2 lbs. methyl acetate
    1 lb. high grade naphtha
13. 80 lbs. 60° Bé. naphtha
    100 lbs. denatured ethyl alcohol
    20 lbs. methyl acetate
14. 8 lbs. liquid polymerized chlorinated diphenyl
    2 lbs. dibutyl phthalate
    90 lbs. monomethyl ether of ethyleneglycol or 90 lbs. denatured alcohol
15. 80 lbs. monomethyl ether of ethylene glycol
    40 lbs. denatured alcohol
    6 lbs. liquid chlorinated polymerized diphenyl For mixtures of vinyl resin and cellulose acetate 16. 50 lbs. acetone
    30 lbs. high grade naphtha
17. 50 lbs. ethyl lactate
    30 lbs. high grade naphtha
18. 50 lbs. monomethyl ether of ethylene glycol
    30 lbs. high grade naphtha
19. 50 lbs. diglycol ether
    30 lbs. high grade naphtha We might comment on the above-noted moistening liquid formulæ:—

1 formula can be used where a high degree of adhesion is desirable and the odor of toluol and naphtha is permissible. It is comparatively cheap.

2 is similar but is quick evaporating.

3 has exceptionally quick tack but due to its very strong odor would seem to have but limited application. This moistening liquid promotes the highest degree of adhesion to various surfaces.

4 and #5 are similar to #3, though of less odor and less tack-producing properties.

6 is exceptionally quick drying and is unsuitable for hand-moistening.

7 gives exceptional adhesion, has high volatility, but develops a relatively poor degree of tackiness.

8 is of medium volatility, gives a high degree of adhesion and fair tackiness, but has a rather bad odor.

9 is of high volatility, gives good adhesion, and does not have objectionable odor for most purposes.

10 is of medium volatility, is more suitable for hand work, and promotes good adhesion to most surfaces, particularly when used liberally.

11 is highly volatile, gives good adhesion, but due to the use of straight lacquer solvent therein, it has the objectionable feature of softening excessively the waterproof or lacquer type of coating on regenerated cellulose hereinbefore described, and permitting it to peel easily when subjected to slight tension.

12 has a high degree of volatility and a high degree of solvent power for lacquer surfaces. However, it is of rather strong odor.

13 of medium volatility and promotes very good adhesion. It is slightly objectionable in its odor on account of the ethyl acetate.

14 is desirable for hand work on account of its low volatility. It also promotes good adhesion and is relatively unobjectionable in its odor. It suffers from the same objection that #11 does with respect to the softening of the lacquer type of surface to which our resin coatings are designed to adhere.

15 is also desirable from the standpoint of odor, but has a higher degree of volatility than #14. It does not soften a nitrocellulose or lacquer surface, such as occurs on the moisture-proof "cellophane" hereinbefore described.

16 is highly volatile.

17 is of low volatility with good solvent power.

18 has relatively less solvent power than #17, yet is very desirable so far as concerns odor.

19 is of medium volatility and is characterized by a strong odor.

In producing a tape to be stuck to "cellophane" closures for milk bottles, it is desirable to apply the adhesive compositions hereinbefore described to one face of the paper tape, and to apply cellulose acetate, cellulose nitrate, or other ester to the other face of the tape. The tape is moistened with the appropriate moistening liquid and stuck to the skirt portion of the "cellophane" closure with one of its end portions overlapping and stuck to the cellulose ester coating on the other end portion. The primary object in using cellulose acetate or cellulose nitrate as a coating on one face of the tape is to render the moistened resin coating on the face more quickly and strongly adherent to the first-mentioned coating when a lap is made. The paper tape is preferably precoated with suitable fillers, as hereinbefore described, on both its faces. It is more economical to use cellulose acetate or cellulose nitrate on one face of the tape, and the adhesive coating composition of the present invention on the face to be secured to the "cellophane." The moistening liquid develops the desired tackiness in the adhesive coating and ensures excellent bonding with the cellulose ester coating, as well as with the "cellophane."

In the case of all the gummed articles hereinbefore mentioned, it is desirable that both faces of the paper or cloth be precoated with suitable sizes, as this tends to inhibit "blocking" of the successive layers constituting a package. The coating of the paper with casein, glue, or starch compositions, makes possible this desideratum. So too, papers which have been body-sized with glue or starch answer our purposes. The use of fillers, as hereinbefore described in the coating compositions makes possible the attainment of a smooth surface and attractive coloring, as the coating composition may of course contain pigments or other coloring agents. When the adhesive composition is applied to one face and cellulose acetate or other cellulose ester is applied to the other face, as in the tape hereinbefore described, there is no tendency for "blocking" of the paper when it is wound into rolls.

In some instances, it may be desirable to compound the vinyl resin with other resins and more particularly natural resins of the character of rosin and copal. It is preferable, however, to use a subordinate amount of these natural resins, say up to about 25% of the weight of the vinyl resin, as in such case, the natural resin does not detract unduly from the desired properties, especially the quickness of tack and the tenacity of adhesion, inherent in the vinyl resin.

We shall now give a definition of what we mean by the following expressions: "solvents", "swelling agents", and "plasticizers", as used in the foregoing description. For the purposes of our invention, a solvent might be defined as a liquid which is capable of dissolving the vinyl resin to form a true solution capable of being diluted indefinitely with such liquid. A swelling agent might be defined as being a liquid which causes an incipient soution or swelling of the vinyl resin without forming a liquid phase which can be diluted with excess or additional swelling agent. A plasticizing agent might be defined as a liquid which functions to soften or plasticize the vinyl resin and which serves to maintain a condition of plasticity therein more or less permanently, conducing to permanent bond or adhesion, when the adhesive composition of the present invention is employed to bond two surfaces together.

We claim:—

1. In the art of sticking a body carrying a substantially dry coating comprising polymerized vinyl ester resin and requiring the use of a moistening liquid to acquire tackiness, the step of controlling the tackiness which consists in applying to the coating a volatile moistening liquid containing a true solvent for the resin and an aliphatic hydrocarbon serving to restrain the true solvent action of said solvent on said resin.

2. In the art of sticking a body carrying a substantially dry coating comprising polymerized vinyl ester resin and cellulose ester and requiring the use of a moistening liquid to acquire tackiness, the step of controlling the tackiness which consists in applying to the coating a volatile solvent liquid for both said esters containing an aliphatic hydrocarbon serving to restrain the true solvent action of said solvent on said resin.

3. In the art of sticking a body carrying a substantially dry coating comprising a preponderant proportion of polymerized vinyl ester resin and a subordinate proportion of cellulose ester and requiring the use of a moistening liquid to acquire tackiness, the step of controlling the tackiness which consists in applying to the coating a volatile solvent liquid for both said esters containing an aliphatic hydrocarbon serving to restrain the true solvent action of said solvent on said resin.

4. In the art of sticking a body carrying a substantially dry coating comprising polymerized vinyl ester resin and cellulose acetate and requiring the use of a moistening liquid to acquire tackiness, the step of controlling the tackiness which consists in applying to the coating a volatile solvent liquid for both said esters containing an aliphatic hydrocarbon serving to restrain the true solvent action of said solvent on said resin.

5. In the art of sticking a body carrying a substantially dry coating comprising polymerized vinyl ester resin and cellulose nitrate and requiring the use of a moistening liquid to acquire tackiness, the step of controlling the tackiness which consists in applying to the coating a volatile solvent liquid for both said esters containing an aliphatic hydrocarbon serving to restrain the true solvent action of said solvent on said resin.

6. In the art of sticking a body carrying a substantially dry coating comprising polymerized vinyl acetate resin and requiring the use of a moistening liquid to acquire tackiness, the step of controlling the tackiness which consists in applying to the coating a volatile moistening liquid containing a true solvent for said resin and an aliphatic hydrocarbon miscible with said true solvent but serving to restrain the true solvent action of said solvent on said resin.

7. In the art of sticking a body carrying a substantially dry coating comprising polymerized vinyl acetate resin and requiring the use of a moistening liquid to acquire tackiness, the step of controlling the tackiness which consists in applying to the coating a volatile moistening liquid containing a true solvent for said resin and an aliphatic hydrocarbon of the nature of gasolene.

8. In the art of sticking a body carrying a substantially dry coating comprising polymerized vinyl acetate resin and requiring the use of a moistening liquid to acquire tackiness, the step of controlling the tackiness which consists in applying to the coating a volatile moistening liquid containing a true solvent for said resin of the nature of ethyl alcohol and an aliphatic hydrocarbon of the nature of gasolene.

9. In the art of sticking a body carrying a substantially dry coating comprising polymerized vinyl acetate resin and cellulose ester and requiring the use of a moistening liquid to acquire tackiness, the step of controlling the tackiness which consists in applying to the coating a volatile solvent liquid for both said esters containing an aliphatic hydrocarbon serving to restrain the solvent action on said resin.

10. In the art of sticking a body carrying a substantially dry coating comprising polymerized vinyl ester resin and requiring the use of a moistening liquid to acquire tackiness, the step of controlling the tackiness which consists in applying to the coating a volatile moistening liquid containing a true solvent for said resin and a non-solvent for said resin miscible with the true solvent but serving to restrain the solvent power of said true solvent on said resin.

11. In the art of sticking a body carrying a substantially dry coating comprising polymerized vinyl ester resin and cellulose ester and requiring the use of a moistening liquid to acquire tackiness, the step of controlling the tackiness which consists in applying to the coating a volatile solvent liquid for both said esters containing a true solvent for said resin and a non-solvent for said resin miscible with the true solvent but serving to restrain the solvent power of said true solvent on said resin.

12. In the art of sticking a body carrying a substantially dry coating comprising a preponderant proportion of polymerized vinyl ester resin and a subordinate proportion of cellulose ester and requiring the use of a moistening liquid to acquire tackiness, the step of controlling the tackiness which consists in applying to the coating a volatile solvent liquid for both said esters containing a true solvent for said resin and a non-solvent for said resin miscible with the true solvent but serving to restrain the solvent power of said true solvent on said resin.

ERNEST L. KALLANDER.
GARDNER R. ALDEN.